(12) United States Patent
Liu (10) Patent No.: US 11,508,163 B2
(45) Date of Patent: Nov. 22, 2022

(54) METHOD AND APPARATUS FOR TRAINING LANE LINE IDENTIFYING MODEL, DEVICE, AND STORAGE MEDIUM

(71) Applicant: Baidu Online Network Technology (Beijing) Co., Ltd., Beijing (CN)

(72) Inventor: Yan Liu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 231 days.

(21) Appl. No.: 16/710,291

(22) Filed: Dec. 11, 2019

(65) Prior Publication Data

US 2020/0349364 A1 Nov. 5, 2020

(30) Foreign Application Priority Data

Apr. 30, 2019 (CN) .......................... 201910363252.3

(51) Int. Cl.
| | | |
|---|---|---|
| G06K 9/00 | (2022.01) | |
| G06V 20/56 | (2022.01) | |
| G06N 3/04 | (2006.01) | |
| G06N 3/08 | (2006.01) | |
| G06V 10/774 | (2022.01) | |
| G06V 10/82 | (2022.01) | |

(52) U.S. Cl.
CPC ......... *G06V 20/588* (2022.01); *G06N 3/0454* (2013.01); *G06N 3/08* (2013.01); *G06V 10/774* (2022.01); *G06V 10/82* (2022.01)

(58) Field of Classification Search
CPC .. G06K 9/00798; G06K 9/627; G06K 9/6256; G06N 3/0454; G06N 3/08
See application file for complete search history.

(56) References Cited

U.S. PATENT DOCUMENTS

| 5,805,733 A | * | 9/1998 | Wang ..................... G06V 20/40 |
| | | | 382/232 |
| 10,685,241 B2 | * | 6/2020 | Kang ........................ G06T 7/70 |
| 2003/0026456 A1 | | 2/2003 | Akutagawa |
| 2015/0170312 A1 | * | 6/2015 | Mehta ................... G06T 1/0085 |
| | | | 382/154 |

(Continued)

FOREIGN PATENT DOCUMENTS

| CN | 108229386 A | 6/2018 |
| CN | 108875766 A | 11/2018 |

(Continued)

OTHER PUBLICATIONS

Chinese Patent Application No. 201910363252.3; Notice of Allowance dated Aug. 9, 2021; 2 pages.

*Primary Examiner* — Solomon G Bezuayehu
(74) *Attorney, Agent, or Firm* — Lathrop GPM LLP (57) ABSTRACT

Embodiments of the present disclosure provide a method and apparatus for training a lane line identifying model. The method includes: acquiring a first image of a lane line, the first image being generated using a generating model based on a second image of the lane line, the first image and the second image of the lane line being associated with different physical environments respectively; acquiring lane line information in the second image of the lane line; and training the lane line identifying model using the first image and the acquired lane line information of the lane line.

18 Claims, 4 Drawing Sheets

(56) References Cited

U.S. PATENT DOCUMENTS

| | | | |
|---|---|---|---|
| 2015/0248588 A1* | 9/2015 | Ishigami | G06T 7/60 382/104 |
| 2018/0164812 A1* | 6/2018 | Oh | G06V 10/82 |
| 2018/0189569 A1* | 7/2018 | Wu | G06V 40/20 |
| 2018/0275658 A1* | 9/2018 | Iandola | G06F 30/20 |
| 2019/0102631 A1* | 4/2019 | Li | G06V 10/764 |
| 2019/0130182 A1* | 5/2019 | Zang | G06V 20/182 |
| 2019/0137294 A1* | 5/2019 | Jung | G06F 16/29 |
| 2019/0171223 A1* | 6/2019 | Liang | G06K 9/6267 |
| 2019/0266418 A1* | 8/2019 | Xu | G05D 1/0221 |
| 2019/0272446 A1* | 9/2019 | Kangaspunta | G06V 10/764 |
| 2019/0279004 A1* | 9/2019 | Kwon | G06V 10/273 |
| 2019/0289282 A1* | 9/2019 | Briggs | H04N 13/296 |
| 2020/0064148 A1* | 2/2020 | Park | G06T 7/70 |
| 2020/0134354 A1* | 4/2020 | Viswanathan | G06V 10/82 |
| 2020/0135030 A1* | 4/2020 | Krivokon | G06V 20/588 |
| 2020/0167689 A1* | 5/2020 | Pojman | G06V 10/255 |
| 2020/0184686 A1* | 6/2020 | Jung | G01C 21/367 |
| 2020/0202174 A1* | 6/2020 | Lin | G06V 10/774 |
| 2020/0231164 A1* | 7/2020 | Vladimerou | G06N 20/00 |
| 2020/0233426 A1* | 7/2020 | Johnson | G01C 21/3658 |
| 2020/0250473 A1* | 8/2020 | Elluswamy | G16Y 20/10 |
| 2020/0307564 A1* | 10/2020 | Rahimi | B60W 60/0011 |
| 2021/0049780 A1* | 2/2021 | Westmacot | G06V 10/82 |
| 2022/0101611 A1* | 3/2022 | Lee | G02B 27/0093 |

FOREIGN PATENT DOCUMENTS

| | | |
|---|---|---|
| CN | 108921089 A | 11/2018 |
| CN | 109131348 A | 1/2019 |
| CN | 109242000 A | 1/2019 |
| CN | 109614968 A | 4/2019 |
| CN | 109614979 A | 4/2019 |
| CN | 109657077 A | 4/2019 |

\* cited by examiner

METHOD AND APPARATUS FOR TRAINING LANE LINE IDENTIFYING MODEL, DEVICE, AND STORAGE MEDIUM

CROSS-REFERENCE TO RELATED APPLICATIONS

This application claims priority to Chinese Patent Application No. 201910363252.3, filed on Apr. 30, 2019, titled "Method and apparatus for training lane line identifying model, device, and computer readable storage medium," which is hereby incorporated by reference in its entirety.

TECHNICAL FIELD

Embodiments of the present disclosure generally relate to the field of intelligent transport, and more particularly to, a method and apparatus, for training a lane line identifying model, a device, and a computer readable storage medium.

BACKGROUND

With the development of artificial intelligence, the intelligent driving technology has attracted more and more attention. In the intelligent driving technology, sensing the surrounding environment is the basis for an intelligent driving vehicle to make a decision. In the field of intelligent driving, lane line information is not only an important item of environment sensing information, but also one kind of basic data of the intelligent driving technology.

Generally, the lane line information in an environment may be identified using a lane line identifying model, such as a neural network. Therefore, how to improve the identification accuracy of the lane line identifying model becomes the focus of attention at present.

SUMMARY

Embodiments of the present disclosure provide a solution to training a lane line identifying model.

In a first aspect of the present disclosure, an embodiment of the present disclosure provides a method for training a lane line identifying model, including: acquiring a first image of a lane line, the first image being generated using a generating model based on a second image of the lane line, the first image and the second image of the lane line being associated with different physical environments respectively; acquiring lane line information in the second image of the lane line; and training the lane line identifying model using the first image and the acquired lane line information of the lane line.

In a second aspect, an embodiment of the present disclosure provides an apparatus for training a lane line identifying model, including: an image acquiring module configured to acquire a first image of a lane line, the first image being generated using a generating model based on a second image of the lane line, the first image and the second image of the lane line being associated with different physical environments respectively; a lane line information acquiring module configured to acquire lane line information in the second image of the lane line; and a training module configured to train the lane line identifying model using the first image and the acquired lane line information of the lane line.

In a third aspect, an embodiment of the present disclosure provides electronic device, including: one or more processors; and a memory configured to store one or more programs, where the one or more programs, when executed by the one or more processors, cause the one or more processors to implement the method according to the first aspect.

In a fourth aspect, an embodiment of the present disclosure provides a computer readable storage medium, storing a computer program thereon, where the program, when executed by a processor, implements the method according to the first aspect.

It should be understood that content described in the "SUMMARY" is neither intended to limit key or important features of embodiments of the present disclosure, nor intended to limit the scope of the present disclosure. Other features of the present disclosure will become readily understood in conjunction with the following description.

BRIEF DESCRIPTION OF THE DRAWINGS

In conjunction with the accompanying drawings and with reference to detailed descriptions below, the above and other features, advantages, and aspects of various embodiments of the present disclosure will become more apparent. Identical or similar reference numerals in the accompanying drawings represent identical or similar elements.

DETAILED DESCRIPTION OF EMBODIMENTS

Embodiments of the present disclosure will be described in more detail below with reference to the accompanying drawings. Some embodiments of the present disclosure are shown in the accompanying drawings. However, it should be understood that the present disclosure may be implemented by various approaches, and should not be construed as being limited to the embodiments set forth herein. On the contrary, these embodiments are provided to more thoroughly and completely understand the present disclosure. It should be understood that the accompanying drawings and embodiments of the present disclosure only play an exemplary role, and are not intended to limit the scope of protection of the present disclosure.

In the description of the embodiments of the present disclosure, the term "including" and similar wordings thereof should be construed as open-ended inclusions, i.e., "including but not limited to." The term "based on" should be construed as "at least partially based on." The term "an embodiment" or "the embodiment" should be construed as "at least one embodiment." The terms, such as "first," and "second," may refer to different or identical objects. Other explicit and implicit definitions may be further included below.

As mentioned above, lane line information in an image of a surrounding environment of a vehicle may be identified generally using a lane line identifying model, such as a neural network. The identification accuracy of such a lane line identifying model largely depends on samples used for training the model. In general, a large number of lane line image samples in a normal physical environment (e.g., normal weather, and light) may be obtained by photographing using a capturing vehicle. However, it is difficult to acquire enough lane line image samples in an abnormal physical environment (conditions, such as bad weather, and abnormal light) by the conventional approach. Due to lack of abnormal samples, and poor visibility of the lane line in the abnormal physical environment, the conventional lane line identifying model is difficult to efficiently identify the lane line information in the lane line image in the abnormal physical environment, and thus may affect the vehicle driving safety.

According to embodiments of the present disclosure, a solution for training a lane line identifying model is provided. In the solution, a first image of a lane line generated using a generating model based on a second image of the lane line may be acquired, where the first image and the second image of the lane line are associated with different physical environments respectively. Further, the lane line information in the second image of the lane line is acquired, and the lane line identifying model is trained using the first image and the lane line information. The solution of the embodiments of the present disclosure generates lane line samples in different physical environments using the generating model, trains the lane line identifying model using the generated lane line samples and the known lane line information, and thus may improve the identification accuracy of the lane line identifying model in different environments.

Figure 1:
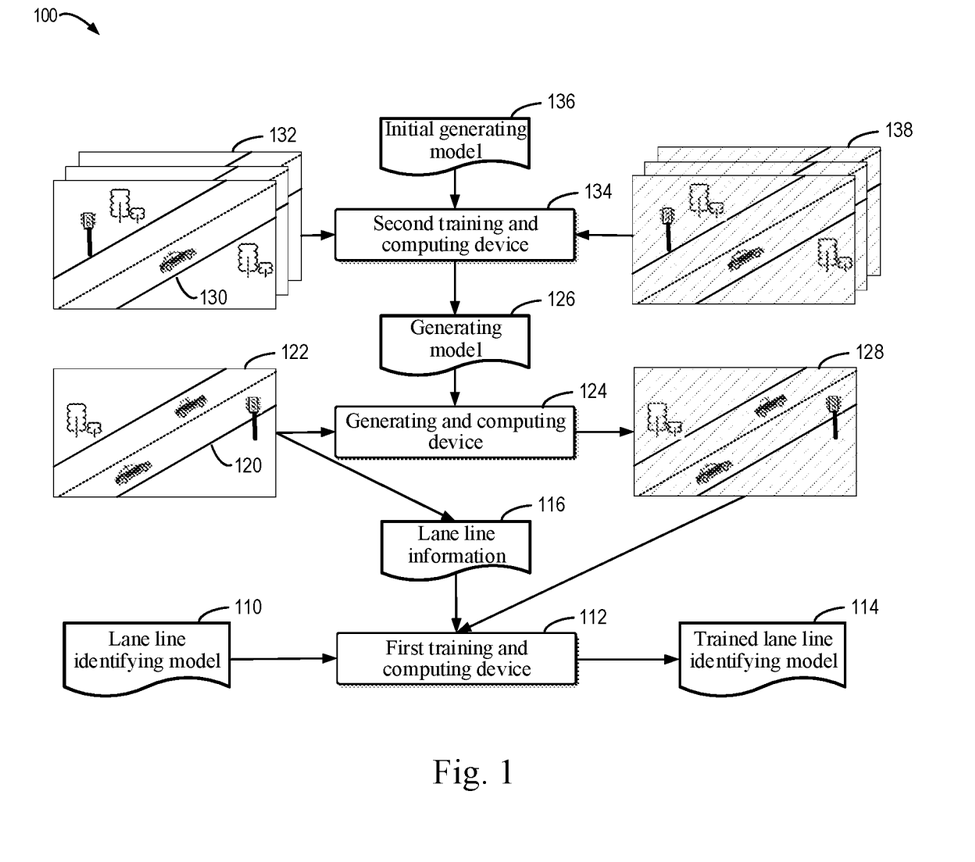
FIG. 1 shows a schematic diagram of an exemplary environment in which a plurality of embodiments of the present disclosure may be implemented.

Embodiments of the present disclosure will be specifically described below with reference to the accompanying drawings. FIG. 1 shows a schematic diagram of an exemplary environment 100 in which a plurality of embodiments of the present disclosure may be implemented. In the exemplary environment 100, a generating and computing device 124 may receive a second image 122 of a generating model 126 and a lane line 120, and process the second image 122 using the generating model 126 to generate a first image 128 of the lane line 120. In some embodiments, the second image 122 and the corresponding first image 128 are associated with different physical environments, where different physical environments correspond to different visibilities of the lane line 120. By way of example, and not limitation, different physical environments may refer to: different weather situations (e.g., rain, hail, snow, fog), different light situations (e.g., daytime and night), different lane line wear situations, different shielding situations, and so on. For example, the second image 122 may be an image of the lane line 120 in a normal weather situation, and thus has a good visibility. Accordingly, the generated first image 128 may be an image indicating the lane line in a bad weather situation, and allows the lane line in the image to have a low visibility.

In some embodiments, the generating model 126 may be a conditional generative adversarial network (cGAN), and may be trained using a pair of images of a reference lane line. As shown in FIG. 1, the generating model 126 may be obtained by a second training and computing device 134. Specifically, the second training and computing device 134 may receive a pair of images 132 and 138 of an initial generating model 136 and a reference lane line 130, where the image pair 132 and 138 of the reference lane line 130 may indicate images of a given reference lane line 130 in different physical environments respectively. For example, the image 132 may be an image of the reference lane line 130 captured in the normal weather situation, and the other image 138 may be an image of the reference lane line 130 captured in the bad weather situation. In some embodiments, the second training and computing device 134 may be a computing device identical to the generating and computing device 124. Alternatively, the second training and computing device 134 may alternatively be a computing device different from the generating and computing device 124.

The initial generating model 136 is trained using a plurality of such sample pairs 132 and 138 to obtain a trained generating model 126, and when the second image 122 and a random noise of the lane line in a normal physical environment are inputted into the trained generating model 126, the first image 128 of the lane line 120 in an abnormal physical environment may be generated. Based on such an approach, a large number of random lane line images in the abnormal physical environment may be generated using a large number of existing lane line images in the normal physical environment.

As shown in FIG. 1, the first training and computing device 112 may receive lane line information 116 and the generated first image 128, where the lane line information 116 is determined based on the second image 122. In some embodiments, the second image 122 may be processed using a lane line identifying model, to extract the lane line information 116 corresponding to the lane line 120. Alternatively, the second image 122 may also be manually annotated to determine the lane line information 116 corresponding to the lane line 120. In some embodiments, the first training and computing device 112 may be a computing device identical to any one of the generating and computing device 124 or the second training and computing device 134. Alternatively, the first training and computing device 112 may also be a computing device different from any one of the generating and computing device 124 or the second training and computing device 134. Just for illustration only, the first training and computing device 112, the generating and computing device 124, and the second training and computing device 134 are shown as separate blocks in FIG. 1. As will be appreciated by those skilled in the art, these devices may be implemented using a physically combined or distributed processing apparatus based on described functions of these devices, and specific implementations are not limited in the embodiments of the present disclosure.

As show in FIG. 1, the first training and computing device 112 further receives the lane line identifying model 110. The lane line identifying model 110 may be a model capable of learning certain knowledge and ability from existing data for processing new data. The lane line identifying model 110 may be designed to identify the lane line from an inputted image (e.g., the first image 128). Examples of the lane line identifying model 110 include, but are not limited to, various types of deep neural networks (DNN), convolutional neural networks (CNN), support vector machines (SVM), decision trees, random forest models, and so on.

The first training and computing device 112 may train the lane line identifying model 110 using the received first image 128 and the received lane line information 116, to obtain a trained lane line identifying model 114. The trained lane line identifying model 114 will have an ability to identify the lane line in a lane line image in the abnormal physical environment, thereby improving the accuracy of identifying the lane line in the abnormal physical environment by the trained lane line identifying model 114.

Figure 2:
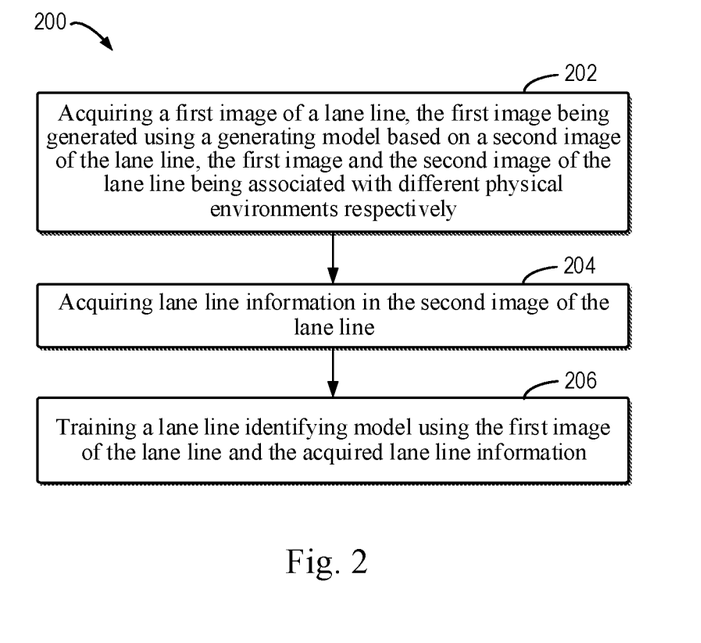
FIG. 2 shows a flowchart of a process of training a lane line identifying model according to an embodiment of the present disclosure.

A process of training the lane line identifying model will be described in more detail below with reference to FIG. 2 to FIG. 4. FIG. 2 shows a flowchart of a process 200 of training a lane line identifying model according to some embodiments of the present disclosure. The process 200 may be implemented by the first training and computing device 112 in FIG. 1. To facilitate description, the process 200 will be described in conjunction with FIG. 1.

In the block 202, the first training and computing device 112 acquires the first image 128 of the lane line 120, where the first image 128 is generated using the generating model 126 based on the second image 122 of the lane line 120, and the first image 128 and the second image 122 of the lane line 120 are associated with different physical environments respectively.

As described above, the different physical environments may be associated with different visibilities of the lane line 120. By way of example, and not limitation, the physical environment may include at least one of following items: weather (e.g., rain, snow, hail, fog), light (e.g., daytime and night), lane line wear situation, lane line shielding situation, or the like. In an abnormal physical environment, the lane line 120 may have a low visibility, for example, due to dense fog, snow coverage, low brightness, and the like.

The probability of occurrence of the abnormal physical environment is relatively low in real life. However, for consideration of driving safety, the trained lane line identifying model 114 should have an ability to process lane line images in various abnormal physical environments. In order to obtain lane line samples in the abnormal physical environment to train the lane line identifying model 110, different from the traditional approach of manually collecting the lane line samples in the abnormal physical environment, the scheme of the present disclosure may generate samples in batches in the abnormal physical environment using the generating model 126 based on a large number of readily obtained samples in a normal physical environment.

A process of training the generating model 126 according to an embodiment of the present disclosure will be described below in conjunction with FIG. 3. FIG. 3 shows a flowchart of a process 300 of training the generating model 126 according to an embodiment of the present disclosure. The process 300 may be implemented by the second training and computing device 134.

Figure 3:
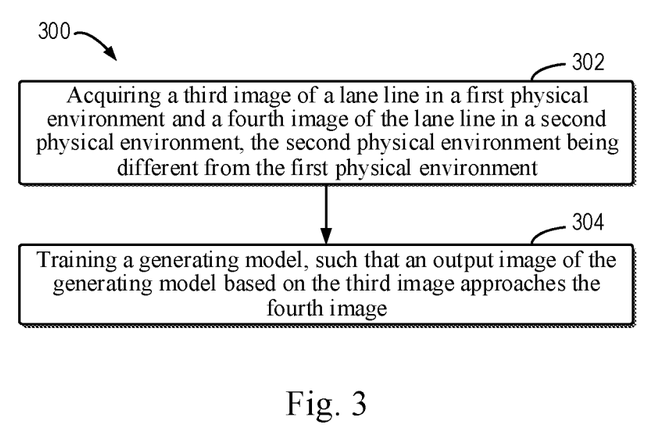
FIG. 3 shows a flowchart of a process of training a generating model according to an embodiment of the present disclosure.

As shown in FIG. 3, in the block 302, the second training and computing device 134 acquires a third image 132 of the reference lane line 130 in a first physical environment and a fourth image 138 of the reference lane line in a second physical environment, where the second physical environment is different from the first physical environment. As described above, the third image 132 and the fourth image 138 may be images of a given reference lane line 130 in different physical environments, where the fourth image 138 may be associated with an abnormal physical environment (e.g., bad weather, lighting condition, wear degree, and shielding degree).

In some embodiments, the third image 132 and the fourth image 138 are captured substantially at a given geographical location. For example, the third image 132 and the fourth image 138 may be captured using a capturing vehicle or by manually photographing substantially at a given position. Alternatively, the third image 132 may also be converted using an image processing technology (e.g., adding fog, or adjusting brightness), to obtain the fourth image 138 associated with a different physical environment. It should be understood that, a position of such an image aligned with a lane line does not offset, such that the generating model 126 will affect only a part indicating the physical environment in the image in subsequent process of generating the image.

In the block 304, the generating and computing device 124 trains the initial generating model 136, such that an output image of the generating model 136 based on the third image 132 approaches the fourth image 138, thus obtaining the trained generating model 126.

As described above, in some embodiments, the initial generating model 136 may be a conditional generative adversarial network (cGAN). Specifically, the third image 132 and a random noise may be inputted into the initial generating model 136, such that the image generated by the initial generating model 136 approaches the fourth image 138 corresponding to another physical environment. In particular, the generating and computing device 124 may adjust parameters of the cGAN, such that a discriminator in the cGAN cannot distinguish between an image generated by a generator and the fourth image 138.

After training the initial generating model 136 using a plurality of such sample pairs to obtain the generating model 126, the generating model 126 may have an ability to generate lane line samples in the abnormal physical environment based on the lane line samples in a normal physical environment.

Further, after completing training the generating model 126, the generating and computing device 124 may acquire the generating model 126, and input the second image 122 and the random noise into the generating model 126, thereby obtaining the first image 128 capable of indicating the different physical environments. Based on such an approach, the solution of the present disclosure may generate a large number of random lane line images in the abnormal physical environment using existing lane line images in the normal physical environment. In some embodiments, the lane line images generated in the abnormal physical environment may be stored in a storage device for subsequent training. Alternatively, the lane line images generated in the abnormal physical environment may also be directly sent to the first training and computing device 112.

Further referring to FIG. 2, in the block 204, the first training and computing device 112 acquires the lane line information 116 in the second image 122 of the lane line 120. As described above, considering that the lane line 120 in the second image 122 has a good visibility, in some embodiments, the second image 122 may be processed using the conventional lane line identifying model (e.g., the lane line identifying model 110), to obtain the lane line information 116. Alternatively, the second image 122 of the lane line 120 may be manually annotated to determine the lane line information 116. As an example, the lane line information 116 may be a group of points identified to be on the lane line 120 in the image 122. Considering that the first image 128 generated by the computing and generating device 124 does not change the position of the lane line 120 in the image, the lane line information 116 determined based on the second image 122 may still indicate the position of the lane line 120 in the first image 128, and may be used to train the lane line identifying model 110. This approach may reduce a lot of work caused by manually annotating the lane line.

In the block 206, the first training and computing device 112 trains the lane line identifying model 110 using the first image 128 of the lane line 120 and the acquired lane line information 116. A process of the block 206 will be described below with reference to FIG. 4. FIG. 4 shows a flowchart of a process of training a lane line identifying model using lane line information and a first image according to an embodiment of the present disclosure.

Figure 4:
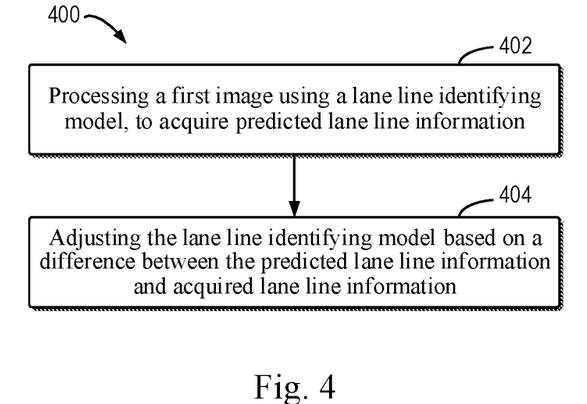
FIG. 4 shows a flowchart of a process of training a lane line identifying model using a first image and lane line information according to an embodiment of the present disclosure.

As show in FIG. 4, in the block 402, the first training and computing device 112 processes the first image 128 using the lane line identifying model 110, to acquire predicted lane line information. In some embodiments, the first training and computing device 112 may receive the lane line identifying model 110, where the lane line identifying model 110 may have been trained for samples in a normal physical environment. Alternatively, the lane line identifying model 110 may also be a to-be-trained new model. Specifically, the first training and computing device 112 may process the first image 128 based on current parameters of the lane line identifying model 110, and obtain predicted lane line information outputted for the first image 128.

In the block 404, the first training and computing device 112 adjusts the lane line identifying model 110 based on a difference between the predicted lane line information and the acquired lane line information 116. Specifically, during training, the first training and computing device 112, for example, may set an objective function to be associated with the difference between the predicted lane line information and the lane line information 116. As an example, the first training and computing device 112 may iteratively adjust the current parameters of the lane line identifying model 110, and stop training when the difference is no longer decreased with the parameter adjustment. Alternatively, the first training and computing device 112 may iteratively adjust the current parameters of the lane line identifying model 110, and stop training when a variation of the difference between two or more iterations is smaller than a particular threshold. It should be understood that, other appropriate convergence conditions may also be provided to complete training the lane line identifying model 110.

The solution of training a lane line identifying model herein may automatically generate a large number of samples in an abnormal physical environment in batches by a generating model based on existing samples in a normal physical environment, thus solving the defect of the conventional solution that is hard to perform effective training for the abnormal physical environment. In addition, the solution further makes full use of the lane line information of the samples in the normal physical environment, and uses the lane line information as the training objective of the samples in the abnormal physical environment, thus reducing the cost of annotating the samples to determine a lane line.

Figure 5:
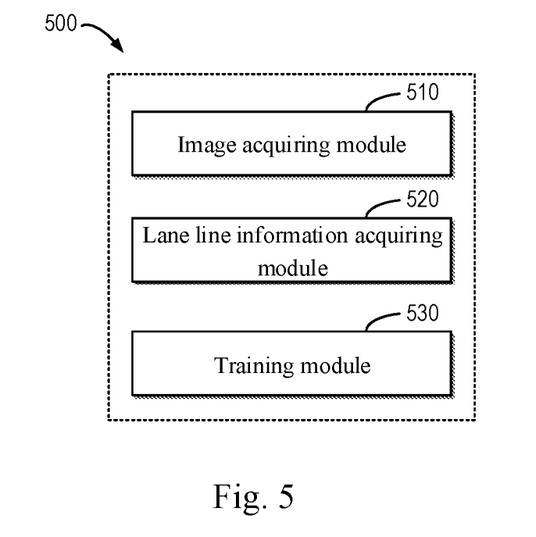
FIG. 5 shows a schematic block diagram of an apparatus for training a lane line identifying model according to an embodiment of the present disclosure.

FIG. 5 shows a schematic block diagram of an apparatus 500 for training a lane line identifying model according to an embodiment of the present disclosure. The apparatus 500 may be included in the first training and computing device 112 of FIG. 1 or be implemented as the first training and computing device 112. As shown in FIG. 5, the apparatus 500 includes: an image acquiring module 510 configured to acquire a first image of a lane line, the first image being generated using a generating model based on a second image of the lane line, the first image and the second image of the lane line being associated with different physical environments respectively. The apparatus 500 further includes a lane line information acquiring module 520 configured to acquire lane line information in the second image of the lane line. Further, the apparatus 500 further includes a training module 530 configured to train the lane line identifying model using the first image and the acquired lane line information of the lane line.

In some embodiments, the generating model may be trained by: acquiring a third image of a reference lane line in a first physical environment and a fourth image of the reference lane line in a second physical environment, the second physical environment being different from the first physical environment; and training the generating model, such that an output image of the generating model based on the third image approaches the fourth image.

In some embodiments, the different physical environments may be associated with different visibilities of the lane line.

In some embodiments, the third image and the fourth image may be captured substantially at a given geographical location.

In some embodiments, the fourth image may be obtained based on image processing of the third image.

In some embodiments, the first image may be generated by: inputting the second image and a random noise into the generating model, to acquire the first image outputted by the generating model.

In some embodiments, the lane line information acquiring module 520 may include: a first determining module configured to process the second image of the lane line using the lane line identifying model to determine the lane line information.

In some embodiments, the lane line information acquiring module 520 may include: a second determining module configured to manually annotate the second image of the lane line to determine the lane line information.

In some embodiments, the generating model may be a conditional generative adversarial network (cGAN).

In some embodiments, the training module 530 may include: a prediction acquiring module configured to process the first image of the lane line using the lane line identifying model to acquire predicted lane line information; and an adjusting module configured to adjust the lane line identifying model based on a difference between the predicted lane line information and the acquired lane line information.

Figure 6:
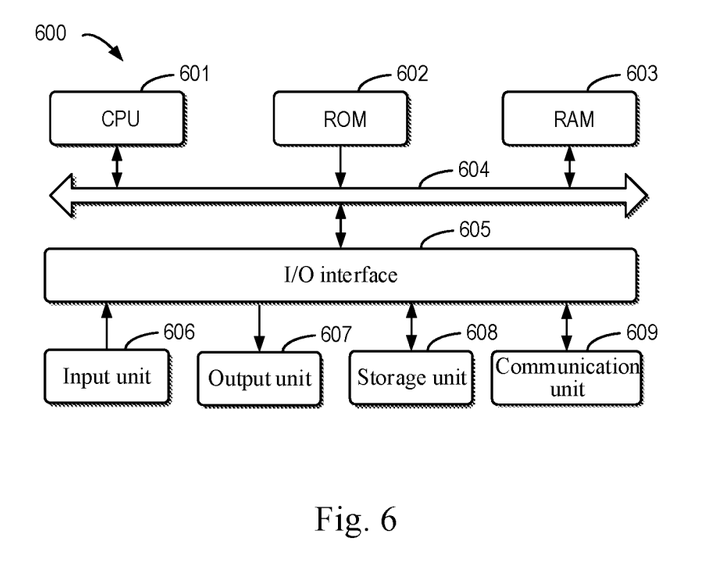
FIG. 6 shows a block diagram of a computing device that may be configured to implement the plurality of embodiments of the present disclosure.

FIG. 6 shows a schematic block diagram of an exemplary device 600 that may be configured to implement some embodiments of the present disclosure. The device 600 may be configured to implement the first training and computing device 112, the generating and computing device 124, and/or the second training and computing device 134 in FIG. 1. As shown in the figure, the device 600 includes a central processing unit (CPU) 601, which may execute various appropriate actions and processes in accordance with computer program instructions stored in a read-only memory (ROM) 602 or computer program instructions loaded into a random access memory (RAM) 603 from a storage unit 608. The RAM 603 may further store various programs and data required by operations of the device 600. The CPU 601, the ROM 602, and the RAM 603 are connected to each other through a bus 604. An input/output (I/O) interface 605 is also connected to the bus 604.

A plurality of components in the device 600 is connected to the I/O interface 605, including: an input unit 606, such as a keyboard, and a mouse; an output unit 607, such as various types of displayers and speakers; a storage unit 608, such as a magnetic disk, and an optical disk; and a communication unit 609, such as a network card, a modem, and a wireless communication transceiver. The communication unit 609 allows the device 600 to exchange information/data with other devices via a computer network, e.g., the Internet, and/or various telecommunication networks.

The processing unit 601 executes various methods and processes described above, such as the process 200, the method 300, and/or the process 400. For example, in some embodiments, the process 200, the method 300, and/or the process 400 may be implemented in a computer software program that is tangibly included in a machine readable medium, such as the storage unit 608. In some embodiments, a part or all of the computer program may be loaded and/or installed onto the device 600 via the ROM 602 and/or the communication unit 609. When the computer program is loaded into the RAM 603 and executed by the CPU 601, one or more steps of the process 200, the method 300, and/or the process 400 described above may be executed. Alternatively, in other embodiments, the CPU 601 may be configured to execute the process 200, the method 300, and/or the process 400 by any other appropriate approach (e.g., by means of firmware).

The functions described above herein may at least partially be executed by one or more logical components of hardware. For example, non-restrictively, usable exemplary types of the logical components of hardware include: a field programmable gate array (FPGA), an application specific integrated circuit (ASIC), an application specific standard product (ASSP), a system-on-a-chip system (SOC), a loading programmable logic device (CPLD), and so on.

Program codes for implementing the method of the embodiments of the present disclosure may be compiled using one or any combination of more programming languages. The program codes may be provided to a processor or controller of a general purpose computer, a special purpose computer, or other programmable data processing apparatuses, such that the program codes, when executed by the processor or controller, cause the functions/operations specified in the flowcharts and/or block diagrams to be implemented. The program codes may be completely executed on a machine, partially executed on a machine, executed as a separate software package on a machine and partially executed on a remote machine, or completely executed on a remote machine or server.

In the context of the present disclosure, a machine readable medium may be a tangible medium which may contain or store a program for use by an instruction execution system, apparatus or device, or used in combination with the instruction execution system, apparatus or device. The machine readable medium may be a machine readable signal medium or a machine readable storage medium. The computer readable medium may include, but is not limited to, electronic, magnetic, optical, electromagnetic, infrared, or semiconductor systems, apparatuses, or devices, or any appropriate combination of the above. A more specific example of the machine readable storage medium will include electrical connection based on one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory device, a magnetic memory device, or any appropriate combination of the above.

Further, while the operations are depicted in a particular order, it should be understood that the operations are requested to be executed in the shown particular order or in a sequential order, or that all illustrated operations are requested to be executed to achieve desired results. In a certain environment, multitasking and parallel processing may be advantageous. Similarly, while a number of specific implementation details are included in the above description, these implementation details should not be construed as limiting the scope of the present disclosure. Some features described in the context of separate embodiments may also be implemented in combination in a single implementation. On the contrary, various features described in the context of a single implementation may also be implemented in a plurality of implementations separately or in any appropriate subcombination.

While the present subject matter has been described in a language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. A method for training a lane line identifying model, comprising:
    acquiring a first image of a lane line, the first image being an image in an abnormal physical environment generated using a generating model based on a second image of the lane line, the first image and the second image of the lane line being associated with different physical environments respectively, wherein the generating model generates images in batches in the abnormal physical environment based on images in a normal physical environment;
    acquiring lane line information in the second image of the lane line;
    processing a first image of the lane line using the lane line identifying model to acquire predicted lane line information, wherein the predicted lane line information indicates a first group of points of the lane line in the first image; and
    adjusting the lane line identifying model based on a difference between the first group of points and a second group of points, wherein the second group of points are points of a lane line indicated by first lane line information in the second image, and the first lane line information is generated by inputting the second image into a lane line recognition model.

2. The method according to claim 1, wherein the generating model is trained by:
    acquiring a third image of a reference lane line in a first physical environment and a fourth image of the reference lane line in a second physical environment, the second physical environment being different from the first physical environment; and
    training the generating model, such that an output image of the generating model based on the third image approaches the fourth image.

3. The method according to claim 2, wherein the third image and the fourth image are captured at a given geographical location.

4. The method according to claim 2, wherein the fourth image is obtained based on image processing of the third image.

5. The method according to claim 1, wherein the different physical environments are associated with different visibilities of the lane line.

6. The method according to claim 1, wherein the first image is generated by:
    inputting the second image and a random noise into the generating model, to acquire the first image outputted by the generating model.

7. The method according to claim 1, wherein the acquiring lane line information comprises:
    processing the first image of the lane line using the lane line identifying model to determine the lane line information.

8. The method according to claim 1, wherein the acquiring lane line information comprises:
  manually annotating the second image of the lane line to determine the lane line information.

9. The method according to claim 1, wherein the generating model is a conditional generative adversarial network.

10. An apparatus for training a lane line identifying model, comprising:
  at least one processor; and
  a memory storing instructions, wherein the instructions when executed by the at least one processor, cause the at least one processor to perform operations, the operations comprising:
  acquiring a first image of a lane line, the first image being an image in an abnormal physical environment generated using a generating model based on a second image of the lane line, the first image and the second image of the lane line being associated with different physical environments respectively, wherein the generating model generates images in batches in the abnormal physical environment based on images in a normal physical environment;
  acquiring lane line information in the second image of the lane line;
  processing a first image of the lane line using the lane line identifying model to acquire predicted lane line information, wherein the predicted lane line information indicates a first group of points of the lane line in the first image; and
  adjusting the lane line identifying model based on a difference between the first group of points and a second group of points, wherein the second group of points are points of a lane line indicated by first lane line information in the second image, and the first lane line information is generated by inputting the second image into a lane line recognition model.

11. The apparatus according to claim 10, wherein the generating model is trained by:
  acquiring a third image of a reference lane line in a first physical environment and a fourth image of the reference lane line in a second physical environment, the second physical environment being different from the first physical environment; and
  training the generating model, such that an output image of the generating model based on the third image approaches the fourth image.

12. The apparatus according to claim 11, wherein the third image and the fourth image are captured at a given geographical location.

13. The apparatus according to claim 11, wherein the fourth image is obtained based on image processing of the third image.

14. The apparatus according to claim 10, wherein the different physical environments are associated with different visibilities of the lane line.

15. The apparatus according to claim 10, wherein the first image is generated by:
  inputting the second image and a random noise into the generating model, to acquire the first image outputted by the generating model.

16. The apparatus according to claim 10, wherein the acquiring lane line information comprises:
  processing the second image of the lane line using the lane line identifying model to determine the lane line information.

17. The apparatus according to claim 10, wherein the acquiring lane line information comprises:
  manually annotating the second image of the lane line to determine the lane line information.

18. A non-transitory computer readable storage medium, storing a computer program thereon, wherein the program, when executed by a processor, causes the processor to perform operations, the operations comprising:
  acquiring a first image of a lane line, the first image being an image in an abnormal physical environment generated using a generating model based on a second image of the lane line, the first image and the second image of the lane line being associated with different physical environments respectively, wherein the generating model generates images in batches in the abnormal physical environment based on images in a normal physical environment;
  acquiring lane line information in the second image of the lane line;
  processing a first image of the lane line using the lane line identifying model to acquire predicted lane line information, wherein the predicted lane line information indicates a first group of points of the lane line in the first image; and
  adjusting the lane line identifying model based on a difference between the first group of points and a second group of points, wherein the second group of points are points of a lane line indicated by first lane line information in the second image, and the first lane line information is generated by inputting the second image into a lane line recognition model.

* * * * *